United States Patent [19]
Richard

[11] 4,081,786
[45] Mar. 28, 1978

[54] HYDROPHONE HAVING A DIRECTIVE LOBE IN THE FORM OF A CARDIOID

[75] Inventor: Monique-Jeanne-Marie Richard, Six Fours, France

[73] Assignee: Etat Francais represente par le Delegue Ministeriel pour l'Armement, France

[21] Appl. No.: 714,666

[22] Filed: Aug. 16, 1976

[51] Int. Cl.[2] .............................................. H04B 13/00
[52] U.S. Cl. ................................... 340/10; 340/8 LF; 340/13 R
[58] Field of Search ................. 310/8.7, 9.1; 340/8 R, 340/8 MM, 8 PC, 8 LF, 9, 10, 12 R, 13 R, 14

[56] References Cited

U.S. PATENT DOCUMENTS

| | | | |
|---|---|---|---|
| 2,374,637 | 4/1945 | Hayes | 340/8 PC |
| 2,405,226 | 8/1946 | Mason | 340/10 |
| 3,351,903 | 11/1967 | Straube | 340/10 |
| 3,360,664 | 12/1967 | Straube | 310/9.1 X |
| 3,672,462 | 6/1972 | Auer, Jr. | 340/8 R |

*Primary Examiner*—Harold Tudor
*Attorney, Agent, or Firm*—Stevens, Davis, Miller & Mosher

[57] ABSTRACT

A hydrophone is disclosed which has a cardioid-shaped directional lobe for selective reception of acoustic waves. The device comprises a cylindrical casing having an acoustic window in a rear member thereof and a piezoelectric transducer supported by an annular internally groove front member. A bottom member located in the opening of the front member and spaced from the piezoelectric transducer is provided with a wall element. A ring element is located in the groove of the front member. Cavities are thus formed between the bottom member of the wall element and between the ring element and the front part of the casing to form thin sheets of air for producing acoustic decoupling to permit reception of acoustic waves impinging on the rear member of the casing and minimizing the effect of acoustic waves received from other directions.

9 Claims, 3 Drawing Figures

HYDROPHONE HAVING A DIRECTIVE LOBE IN THE FORM OF A CARDIOID

BACKGROUND OF THE INVENTION

The present invention relates to transducers and more particularly to piezoelectric devices utilized for the reception of acoustic waves in a submarine environment. More specifically, the invention concerns a hydrophone having a cardioid-shaped directional lobe for selective reception of acoustic waves coming from a specific direction.

In the field of acoustics, there has been considerable research conducted for the purpose of obtaining a hydrophone having directionality of the "cardioid" type. In particular, omnidirectional and bidirectional hydrophones have been combined but this type of hydrophone requires the use of an electrical circuit for balancing. These devices have the disadvantage that a considerable volume of equipment is required rendering them undesirable for certain applications.

In addition, when operating in a submarine environment, many other problems arise and the equipment may have to be modified giving particular consideration to the various materials used. Apparatus has been proposed which operates under the effect of two pressures, one supported by the front face of a flexible lamina and the other by the rear face. However, none of these devices produce a phase displacement such that, when the transducer receives an acoustic wave coming from the rear, the effect on the lamina is negligible.

An object of the invention is to obtain a hydrophone exhibiting directionality of the cardioid type having a single lobe at low frequencies, and which employs a single transducer having reduced space requirements. Such a device is useful in underwater detection and localization systems employing acoustic buoys.

SUMMARY OF THE INVENTION

The object of the invention is attained by the use of a hydrophone comprising a cylindrical casing having a rear member which includes a window for reception of an acoustic wave from a selected direction and a front member which houses the transducer. The front member of the casing is in the form of an annulus having a grooved inner surface in which a ring element is secured. A bottom member provided with a wall element is attached to an intermediate layer separating the rear and front members of the casing so as to project into the central opening of the front member, the bottom member and the wall and ring elements defining thin sheets of air which results in acoustic decoupling. A peripheral enclosure or throat is bound by the ring element and the front member of the casing. This peripheral enclosure may be extended toward the rear member of the casing so that it is concentric with a circular gap between the bottom and front casing members.

The described hydrophone has the advantage that it is directional with the directonal pattern being in the shape of a cardioid having a single lobe at low frequencies. This desirable result is obtained with a single transducer which requires minimal space for mounting and which may be used easily in the body of a buoy. Since the transducer is purely acoustic, it requires no electrical circuits for electronic balancing. Further, the capacity of the piezoelectric element is on the order of a few nanofarads which is significant in matching the device to a preamplifier and in reducing electrical noise.

Other characteristics and advantages of the invention will be better understood from the following description and reference to the drawings wherein.

Figure 1:
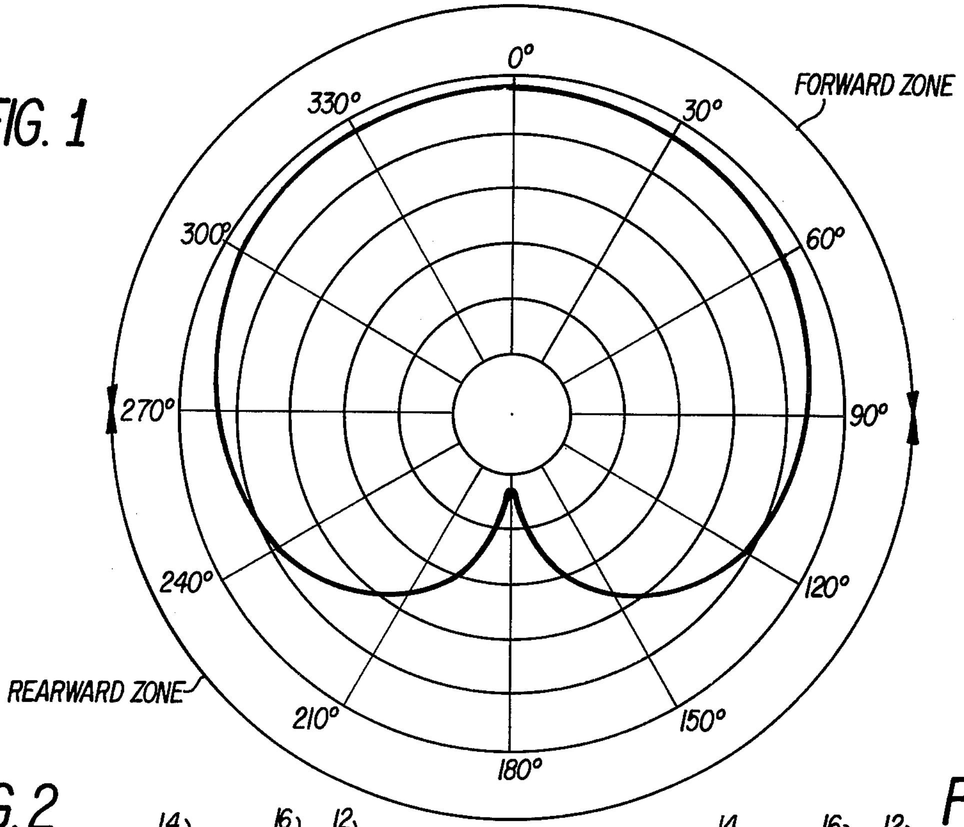
FIG. 1 is a diagram showing the directional characteristics obtained during a test on a hydrophone constructed in accordance with the invention.

Referring to FIG. 1, there is shown the acoustic pattern obtained at a frequency of 10 KHz. It can be seen that the curve obtained from the experimental results approaches that of a cardioid. That is, a single lobe is obtained and the apparatus has greatest sensitivity over a 180° zone extending from 270° to 90° which corresponds to the forward direction of the hydrophone. Furthermore, it will be seen that receptivity diminishes in the rearward zone from 90° to 270° providing the greatest difference between the forward and rearward levels of reception in the direction perpendicular to the forward face.

Figure 2:
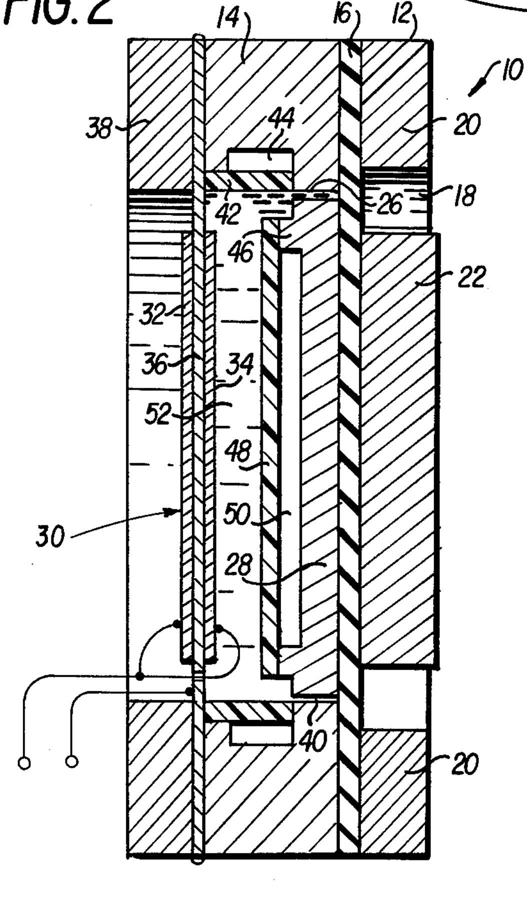
FIG. 2 is a transverse section of a first embodiment of the hydrophone.

FIG. 2 illustrates one embodiment of a hydrophone constructed in accordance with the invention. The outer envelope of the hydrophone comprises a cylindrical brass casing 10 having a rear member 12 and a front member 14. The front and rear members are separated by an intermediate layer 16 which may be made of rubber and has a thickness of approximately 1 millimeter. Layer 16, which is in the form of a disc having a diameter substantially equal to the external diameter of the casing members 12 and 14 may, for example be attached to members 12 and 14 by transverse screws (not shown).

The rear member 12 is provided with a circular acoustic window 18 passing completely through the member. The thickness of the rear member 12 is on the order of 3 millimeters, the portion 20 surrounding the acoustic window 18 being thinner than the central part 22 surrounded by the window.

The front member 14, having a thickness of approximately 10 millimeters, is in the form of an annulus having an inner surface 26 and a central opening. A bottom member 28 is secured to the intermediate layer 16 and is located within the central opening of the front member 14 and spaced from its inner surface 26 to form a circular gap 40.

A piezoelectric transducer 30 composed of a flexible triple lamina consisting of two piezoelectric ceramic layers 32, 34 and a planar electrode 36 positioned therebetween is secured to the front member 14 of the casing and located within the central opening. The layers 32, 34 and the electrode 36 have thicknesses on the order of one-half millimeter. The front member 14 extends forward of the transducer 30 forming a crown-like structure 38. Electrical leads are coupled to a preamplifier (not shown) to produce a voltage corresponding to the received acoustic wave.

The circular gap 40 is of minimal width when considered in relation to the width of the acoustic window 18. In addition, the inner surface of the front member 14 is provided with a groove into which is inserted a polyvinyl chloride ring element 42 which defines a peripheral enclosure 44 filled with air.

The bottom member 28 is provided with a circular upstanding collar 46 to which is fixed at its periphery a polyvinyl chloride disc 48 forming a wall element which, together with the bottom member 28 and collar 46, define a first cavity 50 filled with air. A second cavity 52 comprising the space between the transducer 30, the ring element 42 and the disc 48 is filled with silicone oil.

As a result of the described construction, there is combined an acoustic decoupling which ensures that reception of acoustic waves coming from the front of the apparatus are received and that other waves producing acoustic pressures are cancelled out on the transducer lamina. This decoupling results from the presence of a first thin sheet of air interposed between the ring element 42 and the inner surface of the front member 14 of the casing, and a second thin sheet of air between the bottom member 28 and the disc 48.

Figure 3:
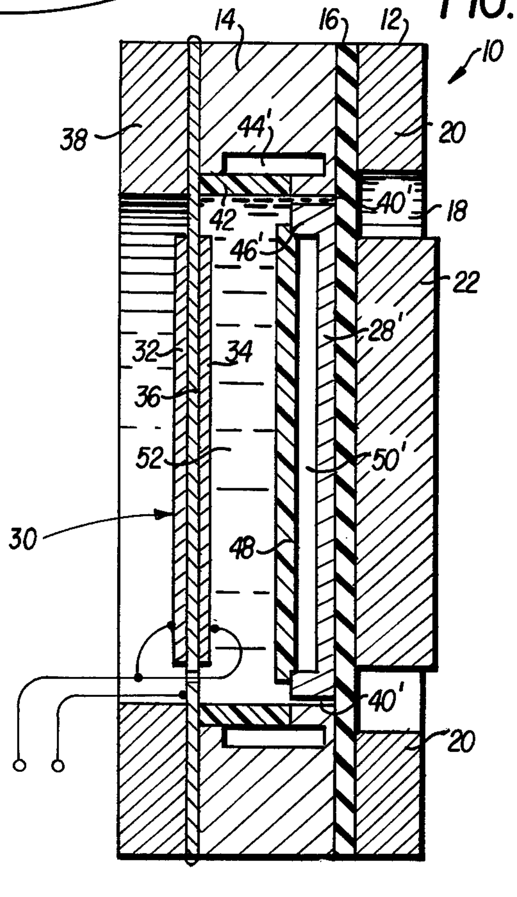
FIG. 3 is a transverse section of a second embodiment of the hydrophone.

FIG. 3 illustrates another embodiment of the invention wherein constituent parts identical to those of the previous embodiment will not be described and have been given the same reference numerals as those in FIG. 2. The embodiment of FIG. 3 offers the advantages of providing supplementary acoustical decoupling.

To achieve this result, a part of the peripheral enclosure 44' and the cavity 50' are located in the plane of the circular gap 40' for a part of its length. In comparison with the embodiment of FIG. 2, it can be seen that the peripheral enclosure 44' has a greater length extending toward the rear member 12 of the casing and is concentric with the circular gap 40'. In addition, the sheet of air 50' is closer to the intermediate layer 16, the peripheral collar 46' defining the gap since the bottom member 28' is of uniform external diameter.

What is claimed is:

1. A hydrophone having a cardioid-shaped directional lobe comprising:
   - a cylindrical casing including front and rear members, said rear member having an acoustic window therein and said front member being in the form of an annulus having a grooved inner surface and a central opening;
   - a bottom member;
   - means for securing the rear member of said casing to said bottom member, said bottom member being located within the central opening of the front member of said casing and spaced from the inner surface thereof to form a circular gap therebetween;
   - a wall element secured to said bottom member and spaced therefrom to form an enclosed first cavity;
   - a piezoelectric transducer having a flexible lamina secured to the front member of said casing and positioned within said central opening, said transducer being adjacent to and spaced from said wall element; and
   - a ring element secured within the groove of the inner surface of the front member of said casing to form a peripheral enclosure between said ring element and the inner surface of said front member, a first thin sheet of air being enclosed by said peripheral enclosure and a second thin sheet of air being enclosed by the cavity between said bottom member and said wall element, said thin sheets of air producing acoustic decoupling to permit reception of acoustic waves impinging on the rear member of said casing and minimizing the effect of acoustic waves received from other directions.

2. A hydrophone as defined by claim 1, wherein said ring and wall elements are composed of polyvinyl chloride having a thickness of approximately one millimeter.

3. A hydrophone as defined by claim 1, wherein said thin sheets of air have thicknesses of approximately one millimeter.

4. A hydrophone as defined by claim 1, wherein said bottom member is provided with a circular upstanding peripheral collar projecting toward said transducer, and wherein said wall is in the form of a disc secured to said collar, said disc, said bottom member and said collar defining said first cavity enclosing said second thin sheet of air.

5. A hydrophone as defined by claim 4, wherein said transducer, said ring element and said disc define a second cavity, said second cavity being filled with silicone oil.

6. A hydrophone as defined by claim 1, which further comprises a resilient member separating the rear member of said casing from the front member of said casing and said bottom member.

7. A hydrophone having a cardioid-shaped directional lobe, comprising:
   - a cylindrical casing including front and rear members, said rear member having a circular acoustic window therein and said front member being in the form of an annulus having a grooved inner surface and a central opening;
   - a bottom member having a circular upstanding collar;
   - means for securing the rear of said casing to said bottom member, said bottom member being located within the central opening of said front member of said casing and spaced from the inner surface thereof to form a circular gap therebetween, said bottom member being provided with a wall element;
   - a piezoelectric transducer having a flexible lamina secured to the front member of said casing and positioned within said central opening, said transducer being spaced from the wall element of said bottom member;
   - a ring element secured within the groove of the inner surface of the front member of said casing, said ring element and said front member together enclosing a first annular sheet of air; and
   - a disc secured to the periphery of the circular upstanding collar of said bottom member, said disc and said bottom member together enclosing a second cylindrical thin sheet of air, said thin sheets of air thereby producing acoustic decoupling to permit reception of acoustic waves impinging on the piezoelectric transducer and minimizing the effect of acoustic waves received from other directions.

8. A hydrophone as defined by claim 7, wherein said ring element and the front member of said casing define a peripheral enclosure therebetween.

9. A hydrophone as defined by claim 8, wherein said ring element and the front member of said casing define a peripheral enclosure which extends toward the rear member of said casing so that said peripheral enclosure is concentric with said circular gap.

* * * * *